United States Patent [19]

Green

[11] Patent Number: 5,189,834
[45] Date of Patent: Mar. 2, 1993

[54] IMPROVED APPARATUS FOR IRRIGATING CONTAINER GROWN PLANTS IN A CLOSED SYSTEM

[76] Inventor: Evert S. Green, 2740 Yacht Club Blvd., Ft. Lauderdale, Fla. 33304

[21] Appl. No.: 693,655

[22] Filed: Apr. 30, 1991

[51] Int. Cl.⁵ ............................................. A01G 31/00
[52] U.S. Cl. ............................................. 47/62; 47/59
[58] Field of Search ............... 47/62, 59, 63, 14, 79, 47/81, 39

[56] References Cited

U.S. PATENT DOCUMENTS

| | | | |
|---|---|---|---|
| 3,300,895 | 1/1967 | Dosedla et al. | 47/62 |
| 3,772,827 | 11/1973 | Ware | 47/62 |
| 4,118,891 | 10/1978 | Kehl et al. | 47/62 |
| 4,170,844 | 10/1979 | Steele | 47/62 |
| 4,276,720 | 7/1981 | Lyon | 47/14 |
| 4,294,037 | 10/1981 | Mosse et al. | 47/59 |

FOREIGN PATENT DOCUMENTS

| | | | |
|---|---|---|---|
| 238945 | of 1969 | U.S.S.R. | 47/62 |
| 0988241 | 1/1983 | U.S.S.R. | 47/62 |

*Primary Examiner*—David A. Scherbel
*Assistant Examiner*—Joanne C. Downs
*Attorney, Agent, or Firm*—Malin, Haley, DiMaggio & Crosby

[57] ABSTRACT

The irrigation and sub-irrigation of plants in containers having holes in the container bottoms are achieved while conserving large amounts of excess water through the use of a plant support bench having special floor lining that includes capillary matting and a pair of capillary sheets disposed above and below the matting. A wick system in conjunction with a closed conduit provides for the return of excess water through apertures defined in the bench bottom into closed conduit system and prevents evaporation of the excess liquids as it is returned to a storage reservoir. Each wick is comprised of horticultural matting and preferably encased in a capillary sheet to ensure a maximum transfer of excess water. A closed irrigation system is provided that conserves water by preventing evaporation and prevents contamination of the water supply that is being stored for reuse.

2 Claims, 4 Drawing Sheets

IMPROVED APPARATUS FOR IRRIGATING CONTAINER GROWN PLANTS IN A CLOSED SYSTEM

BACKGROUND OF THE INVENTION

1. Field of the Invention

This invention relates generally to the irrigation of soil or other growing medium for potted plants, and specifically to a closed irrigation system for container grown plants, preferably for large scale plant culture such as greenhouses, plant nurseries and florist shops, to conserve water, to increase plant irrigation efficiency, and to reduce human labor time involved in keeping the plants properly watered.

2. Description of the Prior Art

Sub-irrigation of soil in containers for container grown plants using systems where the irrigation water is recycled is known in the prior art. My U.S. Pat. No. 4,211,037 issued Jul. 8, 1980 and my U.S. Pat. No. 4,245,434 issued Jan. 20, 1981 disclose systems wherein the sub-irrigation of soil is accomplished through use of a return pipe or feeder tubes and gravity across a large bed using a capillary sheet which comprises a wettable plastic sheet from 1½ to 2 mils in thickness made of polyethylene commonly manufactured in a continuous roll. In general the capillary sheet includes a multiplicity of substantially evenly spaced capillary openings. My U.S. Pat. No. 4,211,037 discloses the construction of the capillary sheet. The capillary hole size for desirable functioning utility may be produced from prongs having diameters which are 0.045". The spacings between the openings in the capillary sheet for practical purposes are regularly spaced approximately one-half inch apart. Although the systems shown in my U.S. patents cited above provide for distribution to supply plants through holes in the bottom of containers and recycled use of irrigating water, the present invention provides improvements in supply water distribution and reuse in a closed system. The term water and liquid used throughout includes all water and aqueous liquids containing plant nutrients. My present invention uses an improved liquid transfer bed in a bench to supply a plurality of conventional potted plants with water and to capture efficiently excess water for reuse. A network of wicks strategically located throughout the bench quickly and efficiently uniformly distribute and transfer excess water from the bench into a closed conduit system which prevents evaporation and prevents outside contamination of the irrigating liquids. My new irrigating system is designed for commercial production or residential environment.

SUMMARY OF THE INVENTION

A closed irrigation system and method for irrigating container grown potted plants comprising a greenhouse bench having a wettable floor of desired width and length for supporting a plurality of potted plants, a bottom plastic capillary sheet, a horticultural capillary matting positioned on top of the bottom sheet, a top plastic capillary sheet covering the capillary matting a wick network on top of and in fluid communication with said top capillary sheet for constant drainage, a closed return conduit in contact with the ends of the wicks and a water supply reservoir.

Plant containers of conventional design including a bottom aperture for receiving moisture through soil contact with the upper capillary sheet can be placed anywhere throughout the bench. The bench floor may include one or more slotted openings for receiving a wick network through the bench floor, terminating the wick ends in a closed water return conduit.

The bench is constructed preferably of a hard plastic material that has a wettable plastic inside bottom surface. The bench includes a perimeter raised wall forming an enclosure to contain water in the bench for flooding purposes. The bench perimeter wall may be any height but is preferably a inch to two inches. The floor of the bench is lined in all areas with capillary matting of approximately ⅜" thickness which collects, distributes and stores the supply water in the bench. The bench may be of any suitable length or width. The two capillary sheets constructed with perforations described above are disposed on the bottom and top surfaces of the capillary matting. The capillary sheets acts to transfer the moisture uniformly to the potted plant container bottom openings which is in contact with the soil in the plant container for controlled irrigation.

One or more wicks made of capillary matting surrounded by a capillary sheet are disposed through the bench floor centrally located slots and extend vertically below the bench bottom to a return pipe. Within the bench enclosure, the wicks run from opposite edges inwardly to the center of the bench to a central slot which may house a pair of wicks, extending from opposite sides of the bench.

Each wick is made from horticultural capillary matting material cut in elongated segments or strips and is covered on all sides with a plastic capillary sheet (perforated as described above) having a plurality of holes uniformly distributed thereabout. These flat elongated strips are placed on top of the top capillary sheet covering the bench bottom.

Mounted below the bench and vertically aligned with the tray bottom slots is an elongated water return conduit having longitudinal slots disposed along the top of the conduit to receive the wick ends of the wicks which are mounted through the bench bottom slots. The bench wicks extend into the return conduit through the conduit slots and contact a second wick strip that is placed on the inside bottom of the return conduit throughout the entire conduit. The return conduit wick terminates at one end into the water supply reservoir. The purpose of the bench and conduit wick system is to uniformly control excess water in the plant bench for constant return to the water return conduit. The return conduit is essentially enclosed (except for the wick slots) to prevent evaporation and possible contamination by accidental spillage into the return flow. Once in the reservoir, the water is again ready for reuse when necessary.

The water supply reservoir contains a water supply dispensing tube and pump and is disposed gravitationally below the return conduit below the bench surface. When the pump is actuated, water is dispensed into the bench.

Through the use of the wick distribution and return system and the enclosed return conduit and reservoir, the invention provides for maximum conservation of water resources while at the same time providing continuous drainage and uniform diffusion of the water throughout the bench bed for ensuring proper controlled irrigation.

Although the system described herein is a closed system, some water will be used by the plants so that some amount of water must be added to the system from time to time.

In an alternate embodiment, on a smaller scale for home use or retail plant sales, a small plant support tray made of a wettable material has the tray bottom covered with a capillary sheet, capillary matting, and another capillary sheet, and a lateral wick which empties over one side of the tray into a small reservoir pouch for recycling excess drainage. This would be appropriate for home usage with a few plants on a single small tray, and also as an inexpensive test unit.

It is an object of this invention to provide an improved plant irrigation system and method which conserves water and prevents contamination of the aqueous liquid used for irrigation in a closed system.

It is another object of this invention to provide a closed irrigation system for potted plants to maintain capillary water in the soil or other plant growing medium in the plant containers through the use of wicks for uniform distribution and to return excess water for reuse in a closed system.

It is yet another object of this invention to provide an irrigation system for potted plants having slow continuous drainage.

In accordance with these and other objects which will be apparent hereinafter, the instant invention will now be described with particular reference to the accompanying drawings.

PREFERRED EMBODIMENT OF THE INVENTION

Figure 1:
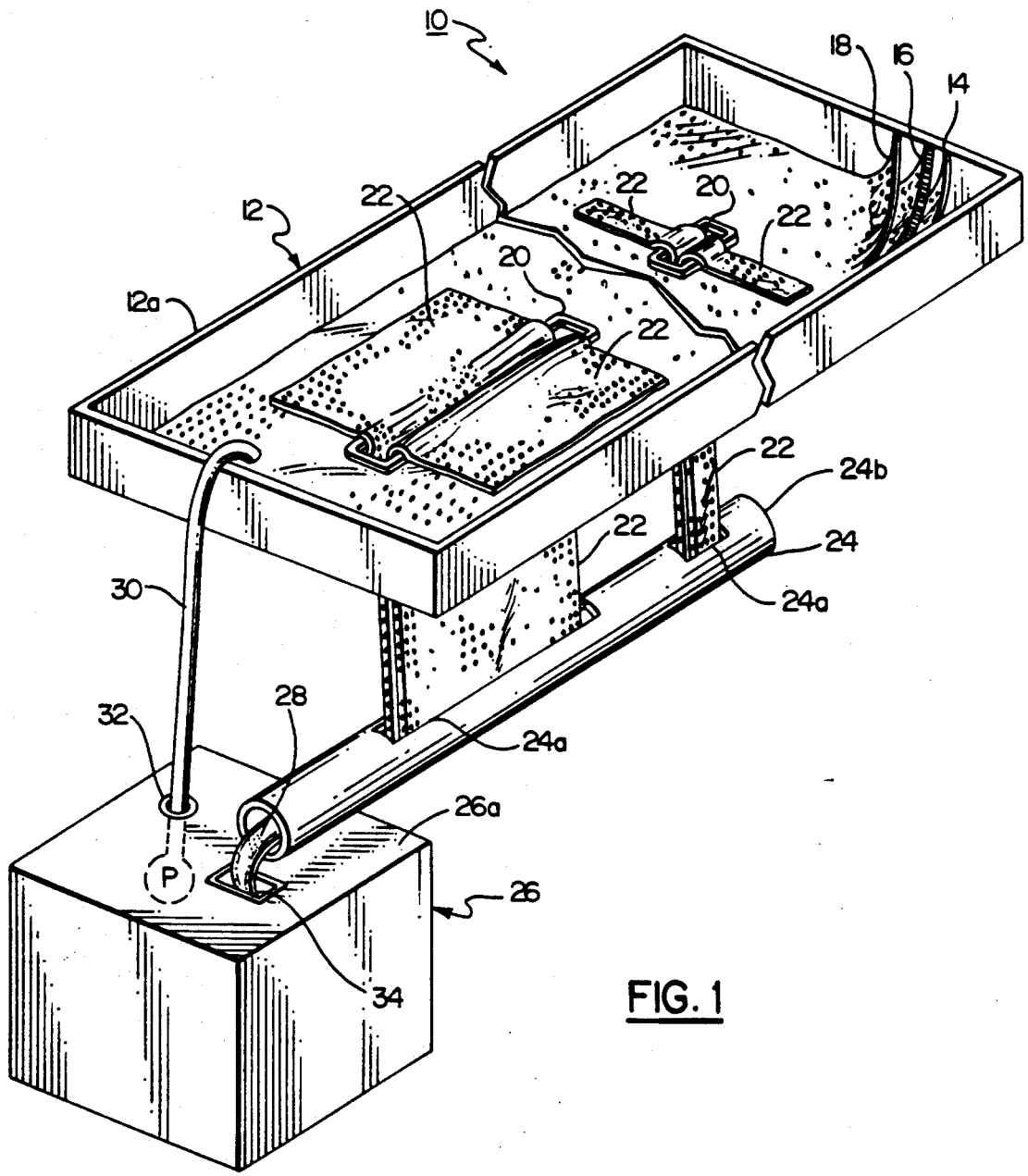
FIG. 1 shows a perspective view of a closed plant irrigation system as disclosed in the present invention.

Referring now to the drawings and especially FIG. 1, the present invention is shown generally at 10 comprised of a flat elongated bench 12 (which could be of any length) constructed preferably of a water impervious, wettable plastic material having a raised side wall 12a around its perimeter which can contain water for flooding purposes. The raised side wall 12a of the bench 12 may be typically sized from one-half to two inches or any desirable height depending on the bench size and the amount of water flooding desired for the type of plants being irrigated.

The greenhouse bench 12 has a perforated capillary sheet (defined above) 14 which lines the bench bottom area throughout the bench floor except over slots 20 which are slotted passages through the floor of bench 12. Mounted on top of the capillary sheet 14 is horticultural capillary matting 16 of approximately ⅜ inches. A second capillary sheet 18 is placed on top of the capillary matting 16 throughout the bench bottom except over slots 20. Applicant has found that the top and bottom capillary sheets 14 and 18 in conjunction with the capillary matting 16 act as a most efficient diffusion and drainage for the water in the bench in conjunction with the wick structure. The capillary sheets 14 and 18 are likewise disposed throughout the total floor area of the bench except for the areas defined by the slots 20 in the bottom floor of the bench.

Each bench 12 includes the use of a plurality of wicks 22 (shown in lateral pairs in FIG. 1) disposed laterally across the bench and lying flat on top of upper capillary sheet 18 with each wick 22 being disposed down through slots 20 positioned in the center longitudinal axis of the bench floor. Each wick 22 terminates in a return excess water conduit 24 which is closed at end 24b. Conduit 24 has a plurality of elongated narrow slots 24a mounted along the top of the conduit 24, positioned in alignment with the bench slots 20 in the bench 12 floor so that each of the wicks 22 fits down through slots 24a in the conduit 24.

Also disposed inside conduit 24, along the inside bottom surface of the conduit is another wick 28 made of capillary matting and externally covered by a capillary sheet. The wick 28 traverses longitudinally along the bottom inside surface throughout the length of conduit 24 and contacts (in the preferred embodiment) each of the ends of wicks 22 to assure the most efficient transfer of excess aqueous liquid or water from the bench. The wick 28 exits conduit 24 at one end and is received through another aperture 34 in the top of water supply reservoir 26 which is used to house the excess water.

The reservoir 26 includes a closed watertight receptacle structure that has a distribution pipe 30 for dispensing water back into bench 12 through an aperture 32 in the top 26a of receptacle 26. Also mounted inside the reservoir 26 is a pump "P" connected to the dispensing conduit 30 which when activated through a power source and switch (not shown) will provide a water supply to bench 12 for controlled irrigation.

Figure 1A:
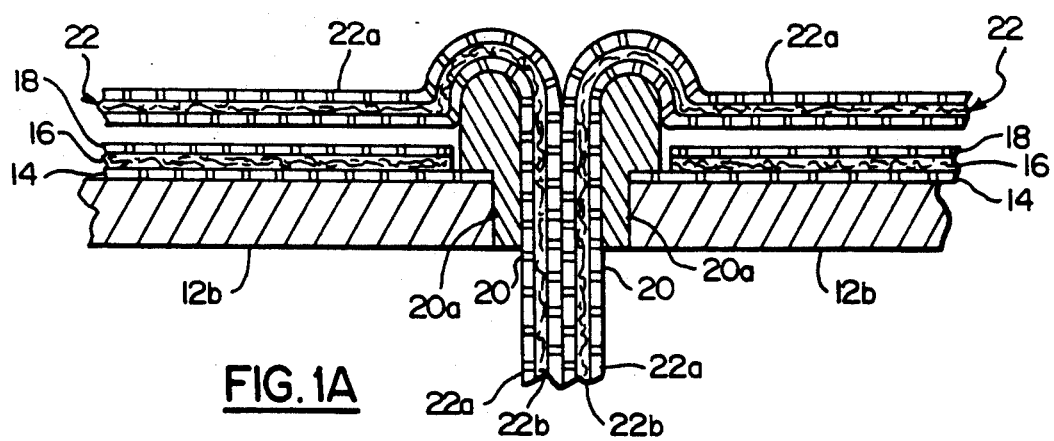
FIG. 1A shows a lateral cross-sectional view of the bench plot and wick utilized in the present invention.

FIG. 1A shows the construction of the wicks, a central aperture slot 20 and the overall matting structure used in the bench floor.

Each bench slot 20 includes a perimeter ridge 20a which surrounds the slot 20 completely. The ridge 20a is higher than the wettable surface of the bench floor 12b so that as water is placed in the bench 12, it will not drain out of the slot 20 but will be retained in the bench bottom for slow continuous drainage by the wicks.

The floor 12b of the bench, as previously shown, has mounted thereon a capillary sheet 14 which contacts the wettable upper surface of the bench floor 12b. A horticultural capillary matting 16 is disposed on top of the capillary sheet 14. A second capillary sheet is disposed o top of the capillary matting 16. The wicks 22 are comprised of the same type capillary matting 22b surrounded on both sides by capillary sheets 22a which have been previously described. As shown in FIG. 1A a pair of wicks 22 are inserted down through slot 20, each wick coming from a lateral edge of the bench. The bench floor covering, which includes the capillary matting 16 and the pair of capillary sheets 14 and 18, extends up to ridge 20a in slot 20.

In operation in the closed system shown in FIG. 1, plants in containers each having a hole in the bottom of the container which allows the soil in the container to communicate and interface with the upper capillary sheet 18 and wicks 22 may be positioned throughout the bench. When the bench 12 is flooded with irrigation water, the wicks 22 will control the transfer of excess water from the bench 12 returning the excess water to the closed conduit 24. Note that because the conduit 24 is closed, excess return water or liquids can not be contaminated by accidental spillage of undesirable liquids into the return conduit. Also there will be minimum evaporation of excess liquid through the return system.

A typical wick structure 22 is comprised of elongated wide or narrow strips of capillary matting 22b encompassed or surrounded by a typical capillary sheet 22a made of a thin polyethylene plastic and containing a plurality of small apertures as previously described. Although it is believed that the capillary matting could be utilized alone as the wick structure, it is believed that the capillary sheets enhance the efficiency of the transfer action.

Figure 1B:
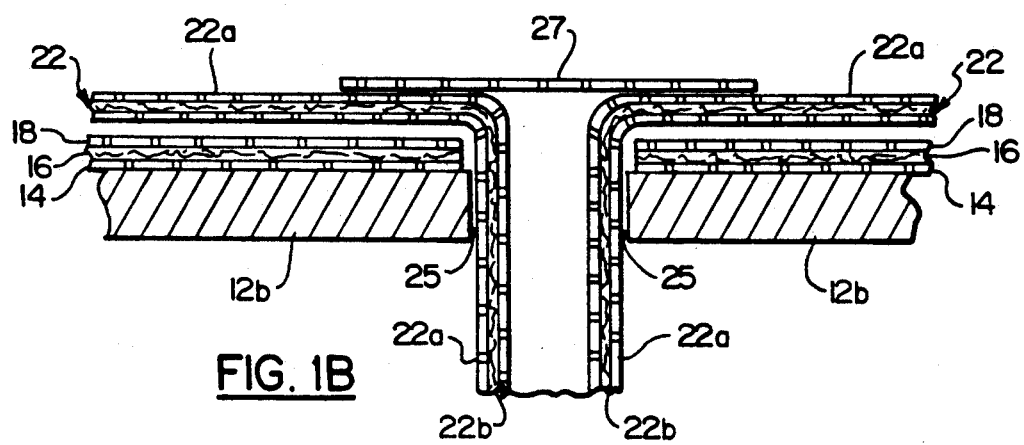
FIG. 1B shows an alternate embodiment of the slot shown in FIG. 1A.

FIG. 1B shows a alternate embodiment with bench slot 25 having no ridge which may be used with a plastic capillary sheet slot cover 27 to reduce drainage through slot 20 when the bench 12 is flooded by controlled release directly from the pump.

Figures 2A, 2B:
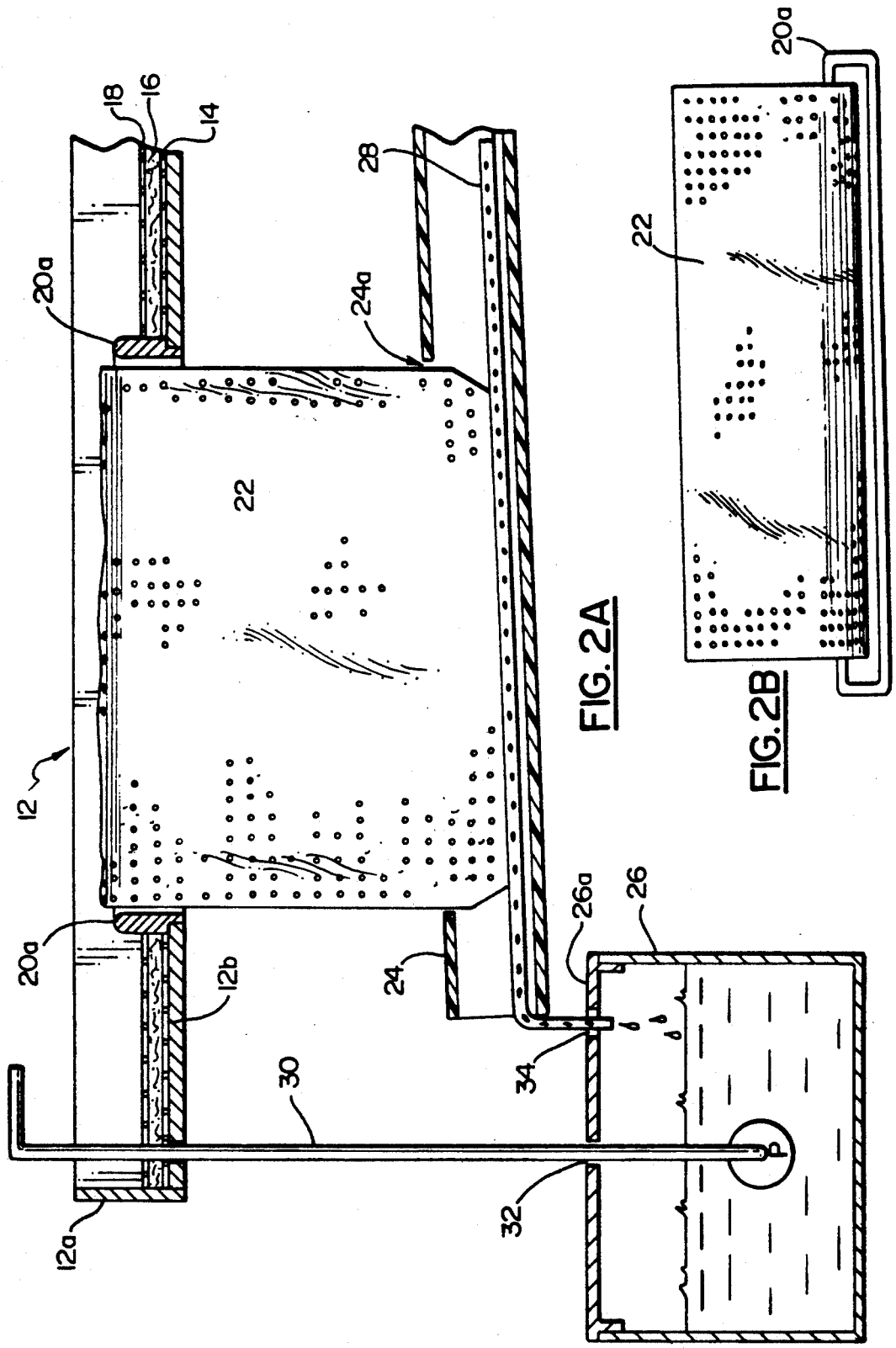
FIG. 2A is a side elevational view in cross section of the irrigation system of FIG. 1.
FIG. 2B shows a partial top plan view of an irrigation system in accordance with the present invention.

Referring now to FIGS. 2A and 2B, the bench 12 is seen bordered by the raised wall 12a and with a plurality of central slots 20 disposed along the center line of the bench. The floor slots 20 include a raised ridge 20a that encircles each slot 20 that allows for a certain amount of water to collect in the bottom of the bench floor without pouring directly out of each slot 20. This ensures for a more positive action of each of the wicks 22 which are placed down through slot 20 and ride over the ridge portion 20a surrounding the slot 20. The ridge 20a height need only be ¼" or so surrounding the slot 20.

The water return conduit 24 includes a separate wick 28 mounted in the inside bottom of conduit 24 that contacts the ends of each of the pair of wicks 22 that project through slot 20 in bench 12 through conduit slots 24a. This contact between wicks 22 and the return wick 28 ensures the maximum and most efficient drainage of liquid from the bench floor and plant containers to the return reservoir 26. Also since conduit 24 is closed (except for the small slot 24a receiving the wicks 22), there will be a minimum evaporation of liquid out the system. The capillary matting used in this invention is a thin (¼-⅜ inch) plastic fiber-like capillary matting manufactured by Troy Mills of Troy, N.H. It may also be known as horticultural matting.

Figure 4:
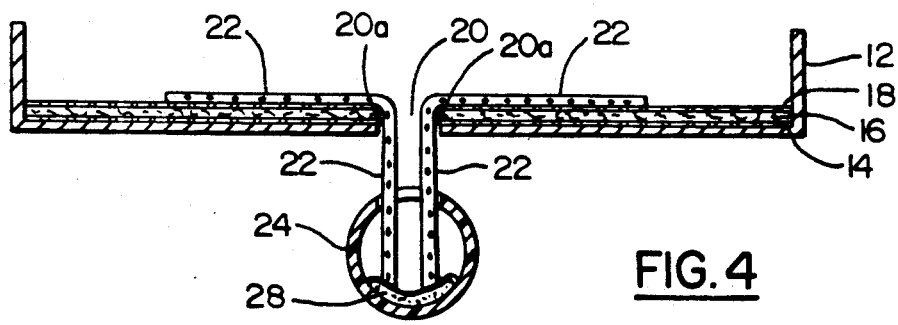
FIG. 4 shows a front elevational view in cross section of the present invention.
Figure 3:
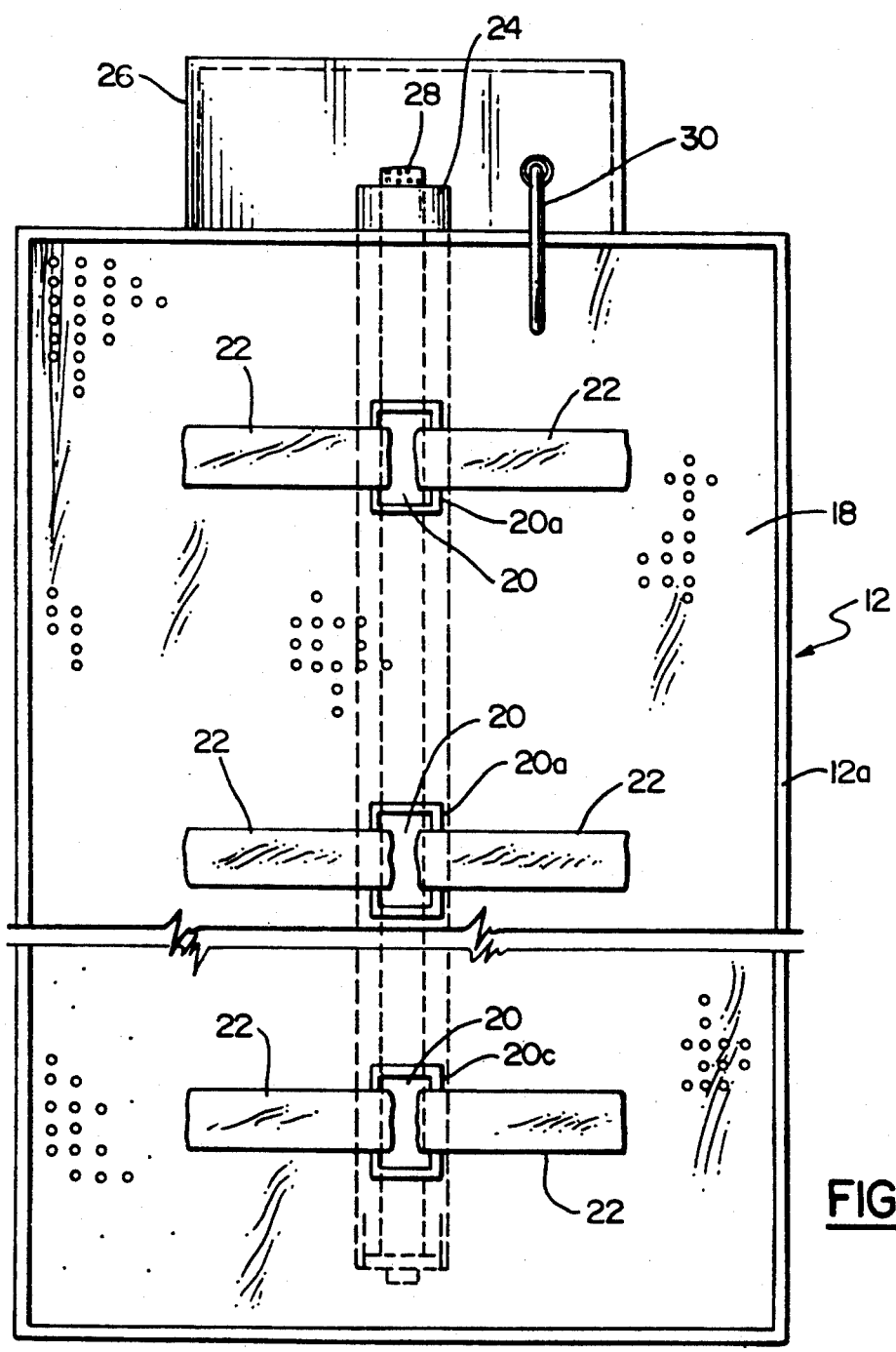
FIG. 3 shows a top plan view of an alternate embodiment of the invention.

Referring to FIGS. 3 and 4, the pair of wicks 22 are received into the return conduit 24 and may contact wick 28 resting on the inside of conduit 24 with wick 28 returning back to a slot in the top of reservoir 26. The pairs of wicks 22 extend from the lateral sides of the bench 12 toward the center slots 20. This embodiment shows the use of wicks 22 that are more narrow than the wicks shown in FIG. 1.

Figure 5:
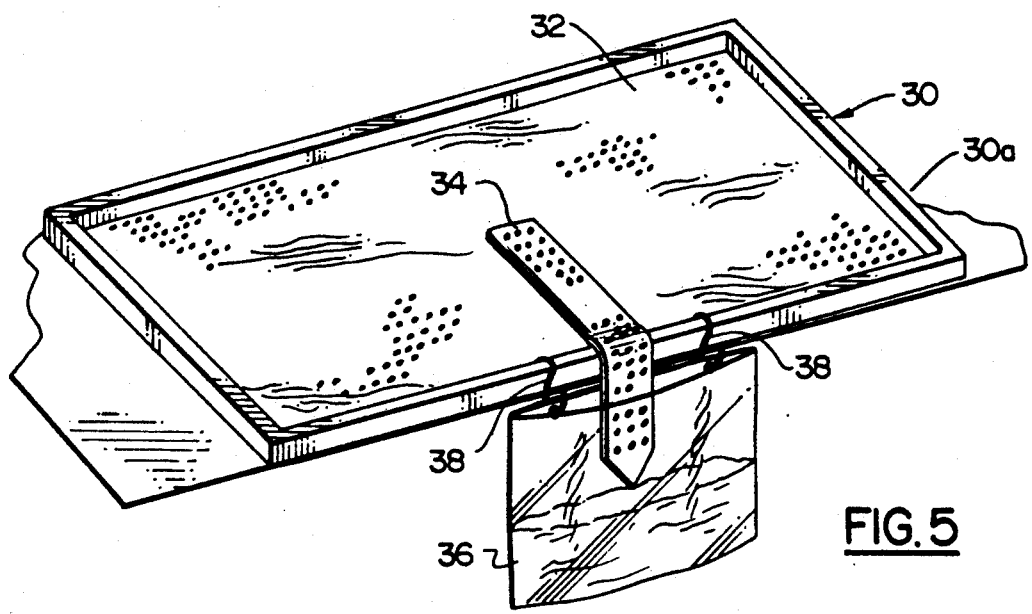
FIG. 5 shows an alternate embodiment of the present invention.

Referring now to FIG. 5, an alternate embodiment of the invention is shown which includes a water impervious plastic tray 30 having a raised perimeter edge 30a. The tray is used for receiving one or more potted plants in conventional containers having holes in the bottom for watering. The bottom of tray 30 includes an upper layer capillary sheet 32 placed on top of a capillary matting sheet disposed on a bottom capillary sheet mounted on the tray floor bottom. However the water return conduit in this embodiment is removed and replaced with a small pouch. This embodiment is useful on a small scale for use in supermarkets for retail sales of potted plants and for home use while still providing maximum conservation of water without tubes, conduits or pumps. In particular, a wick 34 such as the one shown in FIG. 5 may be laterally disposed across the center portion of the tray 30 lying on top of capillary sheet 32 with the end of wick 34 being received into a plastic, water-impervious bag 36 mounted by S-clips or hooks 48 to the side of tray 30. The wick 34 runs along the capillary sheet 32 and up over one side of the tray lip 30a. Excess water will be drained quickly into bag 36 which may be used for saving the water and reusing it for watering purposes.

Referring back to FIG. 1, although the present invention 10 is shown using multiple parallel wicks disposed laterally with central openings, the slotted openings in the bench floor could be anywhere desired, even near one wall, with the wicks being disposed across the entire bench bed.

This system provides for a maximum conservation of water and aqueous liquids used for refurbishing potted plant medium in a closed environment that protects the return flow from accidental contamination by workers spilling non-desirable chemicals or nutrients into the supply system and prevents evaporation by having a closed return system. At the same time it is believed that the water supplying bed employing the capillary matting and the two capillary sheets will replenish and ensure the proper distribution of water or aqueous liquids used to feed the potted plants uniformly throughout the tray. The slow continuous controlled drainage is a feature of this invention in addition to water conservation.

Operators of the system described herein must consider checking the pH level of the reservoir water, which can be controlled by the addition of chemicals to the water or aqueous liquid.

The instant invention has been shown and described herein in what it is considered to be the most practical and preferred embodiment. It is recognized, however, that departures may be made therefrom within the scope of the invention and that obvious modifications will occur to a person skilled in the art.

What I claim is:

1. A system for the irrigation of potted plants each of the plant containers having a hole through its base for receiving water, said system comprising:

elongated flat planar surface defining a bench for receiving and supporting potted plants, said bench including a surrounding wall and an inner bottom surface;

first layer of horticultural capillary matting disposed on top of said bench bottom, said bench bottom being constructed of a wettable water impervious material such as plastic;

first and second capillary sheets disposed above and below, respectively, said sheet of horticultural matting, throughout said bench bottom, said bench bottom having at least one aperture disposed therethrough;

wick means disposed through said bench bottom aperture, said wick disposed about a portion of said bench bottom in contact with said first capillary sheet;

closed conduit means disposed beneath said bench, said conduit including an aperture for receiving said wick means;

reservoir means connected to said outlet of said conduit means for receiving excess water received through said wick means.

2. A system as in claim 1, including a second elongated wick means disposed within said conduit.

* * * * *